United States Patent [19]

Long et al.

[11] 4,436,574
[45] Mar. 13, 1984

[54] RADIAL MANDREL

[75] Inventors: Robert C. Long, Randolph; Richard K. Peters, Tallmadge, both of Ohio

[73] Assignee: Eagle-Picher Industries, Inc., Cincinnati, Ohio

[21] Appl. No.: 449,135

[22] Filed: Dec. 13, 1982

[51] Int. Cl.³ .......................................... B29H 17/16
[52] U.S. Cl. .................................. 156/415; 156/417;
242/72.1; 269/48.1; 279/2 R
[58] Field of Search ................ 156/414, 415, 417–420;
242/72 R, 72.1; 279/2 R; 269/48.1

[56] References Cited

U.S. PATENT DOCUMENTS

| | | | |
|---|---|---|---|
| 1,903,202 | 3/1933 | Stevens | 196/418 |
| 3,002,875 | 10/1961 | Trevaskis | 156/417 |
| 3,375,154 | 3/1968 | Ruttenberg et al. | 156/418 |
| 3,817,812 | 6/1974 | Toshinori | 156/415 |

*Primary Examiner*—William A. Powell
*Assistant Examiner*—Thomas Bokan
*Attorney, Agent, or Firm*—Wood, Herron & Evans

[57] ABSTRACT

A radial mandrel is provided having a plurality of alternating and interfitting large and small segments mounted on a pair of cones, which cones are movable axially toward and away from one another to in turn move the segments radially inwardly and outwardly between a contracted and expanded position. The radial mandrel includes an improved mechanism for axially moving the cones comprising a quill adapter and scroll sleeve adapted for use with a drive shaft of standard configuration. The scroll sleeve is formed with spiral grooves which engage the cones and are operable to move the cones axially toward and away from one another as the scroll sleeve is rotated.

8 Claims, 4 Drawing Figures

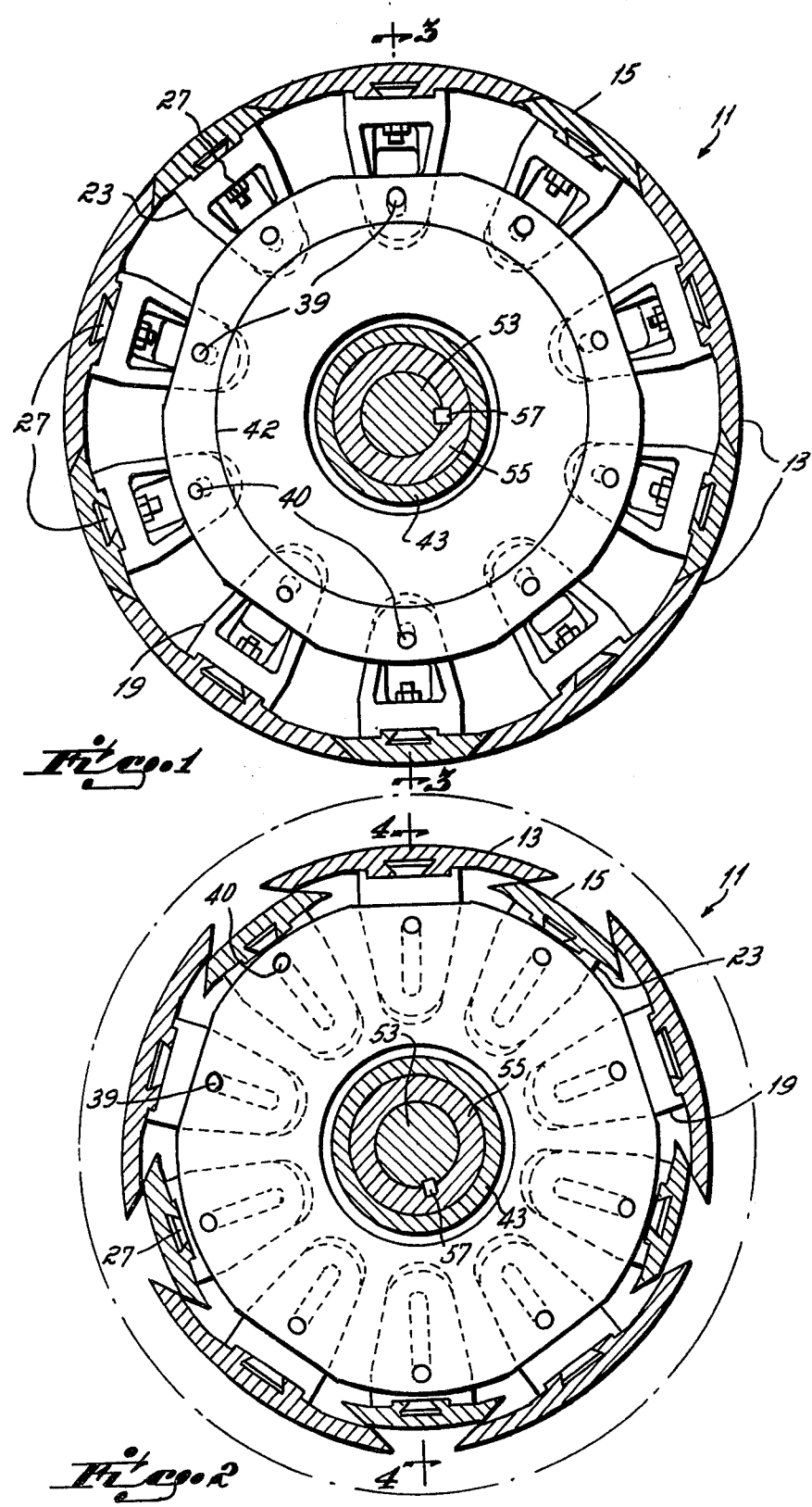

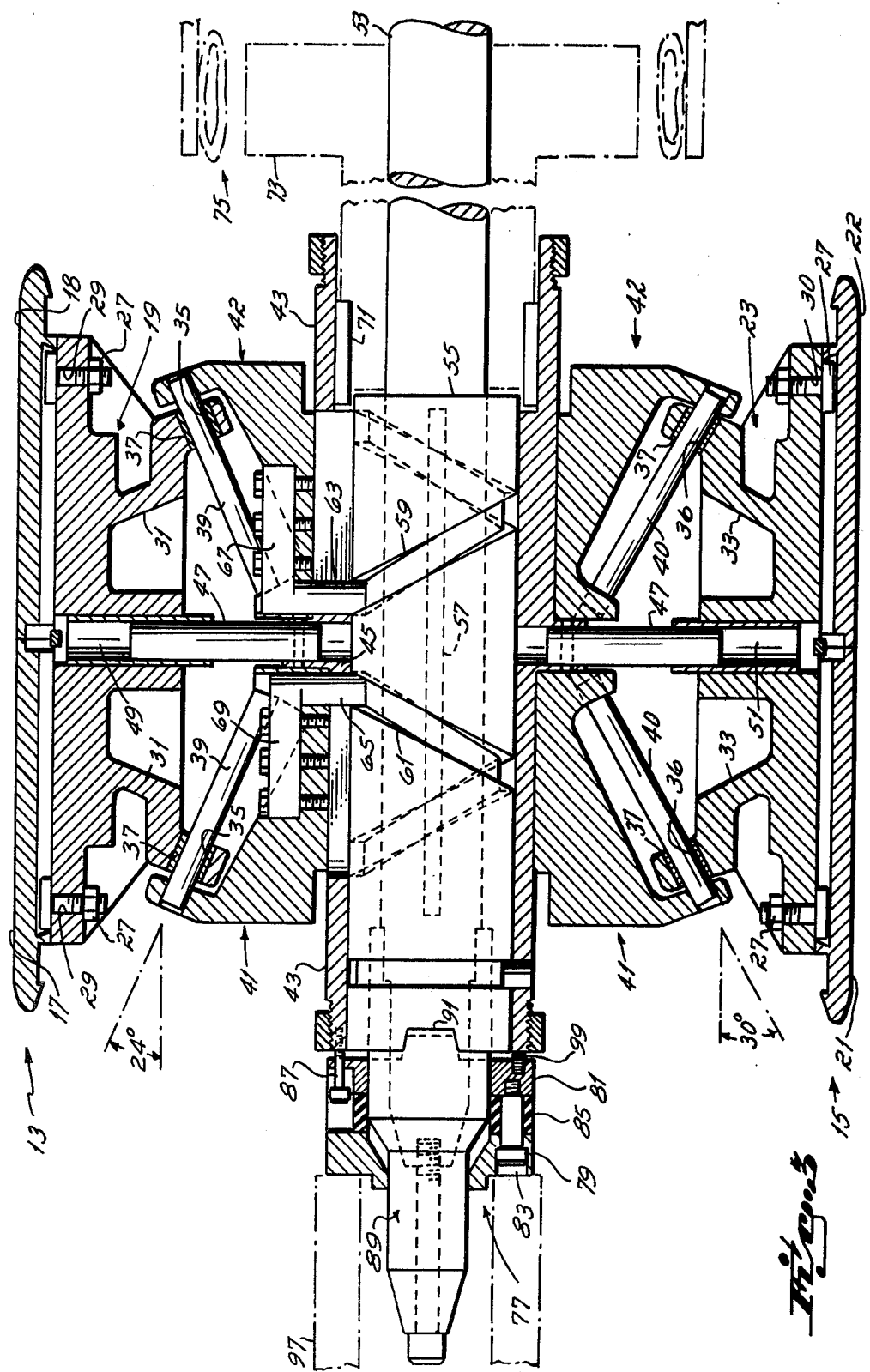

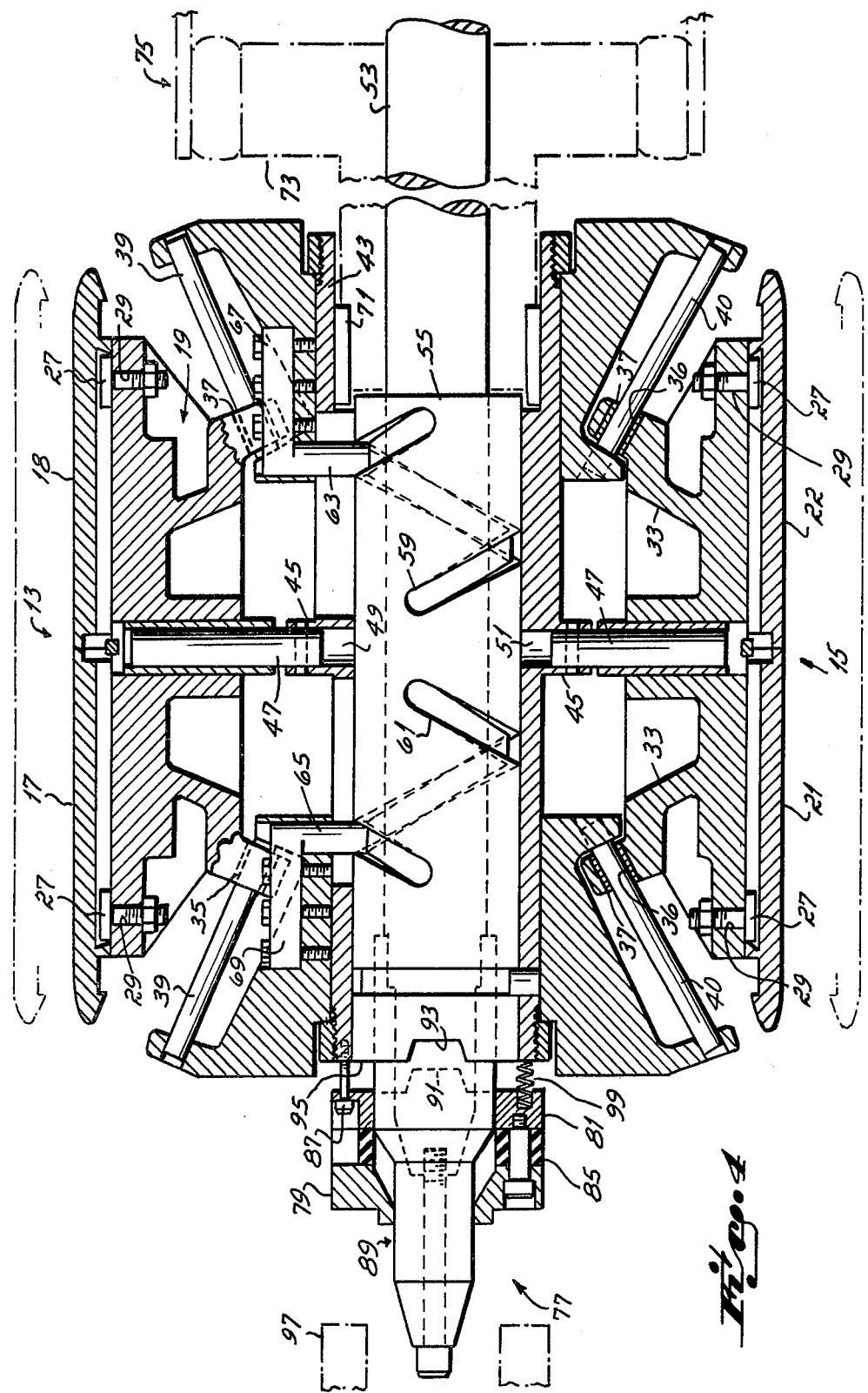

RADIAL MANDREL

FIELD OF THE INVENTION

This invention relates to a radial mandrel for building tires, bands, laminated products and coils, and, more particularly, to an improved mechanism for moving the outer cylindrical shell portions of the radial mandrel between an expanded and contracted position.

BACKGROUND OF THE INVENTION

A radial mandrel or winding drum for the manufacture of tires, laminated products, bands or coils is cylindrical in configuration and mounted for rotation. Piles of the material, such as uncured rubber in the case of tire building, are wrapped about the mandrel to form a carcass. The carcass is thereafter removed from the mandrel for further processing.

A typical radial mandrel or winding drum is made up of a plurality of alternate large and small segments having alternate large and small arcuate shells on their outer surfaces. A detailed discussion of a winding drum in which such structural features and their operation are described is provided in U.S. Pat. No. 3,375,154, which is particularly directed to a tire building drum. As in similar tire building drums, the segments of the '154 patent are adapted to be expanded radially until the shells form a substantially perfect cylinder on which the carcass is formed. Upon completion of the winding operation, the segments are adapted to be contracted so as to pull the shells away from the tire carcass and enable the carcass to be easily removed from the drum.

There are several variations in the prior art for expanding and contracting the segments of the mandrel or drum during a complete winding operation for a tire or other object. The apparatus shown in the '154 patent includes a threaded shaft arrangement whose threads are reversed at each end so that rotation in one direction causes threaded members disposed on each end to move axially toward one another and rotation in the opposite direction causes such members to move axially outwardly from each other. The large and small segments communicate with such members to move radially inwardly and outwardly as such members move toward and away from one another. Although this shaft configuration provides a workable mechanism for expanding and contracting the large and small segments of such winding drums, it can be appreciated that machining a shaft whose threads are reversed at each end is relatively costly. In addition, a shaft of such specialized design may not be readily retrofitted or substituted for similar structure in other radial mandrel or winding drum designs.

It has therefore been an object of this invention to provide a mechanism for expanding and contracting the segments and shells of a radial mandrel or winding drum, which mechanism is relatively simple in construction and may be readily adapted with radial mandrels and winding drums of various designs.

It is another object of this invention to provide a mechanism for expanding and contracting a radial mandrel or winding drum which can be adapted for use with a standard drive shaft.

SUMMARY OF THE INVENTION

These and other objectives are accomplished by an expansion and contracting mechanism for a radial mandrel according to this invention which comprises a scroll sleeve having an interior surface provided with a key for engagement with the drive shaft, and an exterior surface formed with right and left-hand spiral grooves. Drive pins, connected to cones which support the large and small segments of the radial mandrel, extend within respective spiral grooves in the scroll sleeve and are movable therealong to axially reciprocate the cones toward and away from one another for radially moving the large and small segments between a contracted position and an expanded position.

With the large and small segments locked in an expanded position, the large and small shells attached thereto form an essentially perfect cylinder within a tolerance of approximately 0.003" in preparation for a winding operation. Once the winding operation is completed, the large and small segments are contracted by operation of the scroll sleeve structure of this invention to permit removal of the wound object from the radial mandrel.

Unlike prior art expansion and contraction mechanisms adapted for use with radial mandrels or winding drums, the scroll sleeve configuration of this invention may be utilized with a standard shaft, thereby reducing the expense and allowing the mechanism herein to be much more readily adapted for use in other radial mandrel designs.

DESCRIPTION OF THE DRAWINGS

The structure, operation and advantages of this invention will become apparent upon consideration of the following discussion taken in conjunction with the accompanying drawings wherein:

FIG. 1 is an end view of a radial mandrel having the expansion and contraction mechanism of this invention, with the mandrel in an expanded position;

FIG. 2 is a view of the radial mandrel of FIG. 1 in the contracted position;

FIG. 3 is a partial cross-sectional view taken generally along line 3—3 of FIG. 1 showing the details of the expansion and contraction mechanism herein with the radial mandrel in an expanded position; and FIG. 4 is a partial cross-sectional view taken generally along line 4—4 of FIG. 2 showing the expansion and contraction mechanism of this invention with the radial mandrel in a contracted position.

DETAILED DESCRIPTION OF THE INVENTION

Referring now to the drawings, a radial mandrel incorporating the structure of this invention is labeled generally with the reference numberal 11. Many similarities exist between radial mandrel 11 and the tire building drum disclosed in detail in U.S. Pat. No. 3,375,154. Such similar structure will be described only generally herein, and reference to the '154 patent should be made for a detailed discussion of the common subject matter. However, it should be understood that while the '154 patent is primarily directed to a tire building drum, the radial mandrel of this invention is not so limited and may be used for forming bands, laminated products, coils and other structures in addition to tires.

The radial mandrel 11 includes a plurality of alternating large shells 13 and small shells 15. Each large shell 13 is divided into two shell halves 17 and 18, both of which are mounted to a large segment 19. Similarly, each small shell 15 is formed in two shell halves 21 and 22 which are mounted to small segments 23. The outer surfaces of shell halves 17, 18 and 21, 22 are arcuate in configuration and engage one another in the expanded position of mandrel 11 as discussed below so as to form a smooth cylindrical surface upon which an object to be formed with the radial mandrel 11 is built. A T-slot is formed in the undersurface of each shell half 17, 18 and 21, 22 to receive a T-bolt 27 passing through the holes 29 and 30 in the large and small segments 19 and 23, respectively.

The large segments 19 are each formed with downwardly-angulated legs 31, each having bores 35 with bearing sleeves 37 for receipt of angulated pins 39. Similarly, small segments 23 are provided with downwardly-angulated legs 33 formed with bores 36 having bearing sleeves 37 for the receipt of angulated pins 40. The angulated pins 39 and 40 extend between bearing surfaces of a pair of cones 41 and 42 respectively, which are axially slidable with respect to a quill adapted 43 as discussed in detail below.

The quill adapter 43 has a centrally located annular hub 45 to which a plurality of guide studs 47 are mounted. Each of the large segments 19 and small segments 23 has a central bore 49 and 51, respectively, through which a guide stud 47 passes in order to prevent lateral shifting of the segments 19, 23 and shells 13, 15.

The above-described structural elements of radial mandrel 11 are essentially identical to those discussed in detail in the '154 patent, and, as mentioned above, reference should be made to that disclosure for a more complete description. The improvement over existing radial mandrels or winding drums to which this invention is directed comprises a contraction and expansion mechanism for the axial reciprocation of the cones 41 and 42 with respect to quill adapter 43.

Referring now to FIGS. 3 and 4, a standard drive shaft 53 is shown extending longitudinally through the radial mandrel 11. A scroll sleeve 55 is concentrically disposed about drive shaft 53 and connected for rotation thereto by means of a key 57 extending along the interior surface thereof. The exterior surface of scroll sleeve 55 is formed with a right-hand spiral groove 59 and a left-hand spiral groove 61 which are spaced from one another along scroll sleeve 55 as shown in the drawings. The spiral grooves 59 and 61 engage respective ones of a pair of drive pins 63 and 65 which are mounted by means of brackets 67, 69 to respective ones of the cones 41 and 42, respectively.

The quill adapter 43 is concentrically disposed about the scroll sleeve 55 and is connected at one end by means of a key 71 to a quill 73. In turn, the quill 73 is rotatably connected to the drive shaft 53 by an air brake 75 as discussed in detail below. The other end of quill adapter 43 is connected to a lock collar assembly labeled generally with the reference numeral 77. The lock collar assembly 77 includes an outer collar 79 connected to an inner collar 81 by retaining bolts 83, only one of which is shown, with an annular bumper 85 of resilient material disposed therebetween. A plurality of guide bolts 87 extend between the inner collar 81 and quill adapter 43 to connect the two together. Disposed within the inner and outer collars 79 and 81 is a two-piece locking shaft 89 having a tapered extension 91 which is mateable with a cutout 93 formed in the facing edge 95 of scroll sleeve 55. Although not shown in full detail in the drawings, there are two tapered extensions 91 and cutouts 93 which are operable to engage one another.

As discussed in more detail below, an annual tail stock 97 is engageable with the outer collar 79 of lock collar assembly 77 to urge the tapered extensions 91 into engagemeht with cutouts 93. This locks the large and small segments 19, 23 in an expanded position since the quill adapter 43 is connected to such large and small segments 19, 23 by guide studs 47. When the tail stock 97 is released, a spring 99 mounted between inner collar 81 and quill adapter 43 operates to urge the tapered extensions 91 outwardly from cutouts 93.

The operation and advantages of this invention may be better understood by discussing how expansion and contraction of the radial mandrel 11 is accomplished by this invention. In the expanded position of the large and small segments 19, 23 and shells 13, 15 shown in FIG. 3, virtually the entire radial mandrel 11 rotates with drive shaft 53. Beginning at the right-hand portion of FIG. 3 and moving to the left, it is seen that the air brake 75 is maintained out of engagement with quill 73 when the large and small shells 13, 15 are to be placed in an expanded position. The quill 73 is thus free to rotate with drive shaft 53, which in turn causes quill adapter 43 to rotate since it is connected by key 71 to quill 73. In the expanded position of large and small shells 13, 15, the annular tail stock 97 urges the tapered extensions 91 of lock collar assembly 77 into engagement with the cutouts 93 of scroll sleeve 55. The rotation of quill adapter 43 is thus transmitted to scroll sleeve 55 through the lock collar assembly 77. Since each of the large and small segments 19 and 23 are connected to the hub 45 of the quill adapter 43 though respective guide studs 47, the segments 19, 23 and shells 13, 15 also rotate with drive shaft 53 through quill adapter 43. The connection of quill adapter 43, and in turn segments 19, 23, to the drive shaft 53 by means of lock collar assembly 77 also acts to lock segments 19, 23 into place in the expanded position.

In the expanded mode of a radial mandrel 11, a winding operation for the formation of a tire, laminated product or coil may be conducted. As mentioned above, the larger and smaller shells 13 and 15 join together and form a nearly perfect cylindrical surface on which the product carcass is built. Once this operation is completed, the large and small segments 19, 23 must be movable inwardly to collapse the large and small shells 13, 15 so that the carcass may be removed from the radial mandrel 11.

Referring now to FIG. 4, the collapsing operation of this invention is shown. Initially, the annular tail stock 97 is removed from engagement with the outer collar 79 of lock collar assembly 77 at which time the spring 99 urges the tapered extensions 91 out of engagement with cutouts 93 of scroll sleeve 55. With the quill adapter 43 thus no longer in engagement with shaft 53 as lock collar assembly 77 is disengaged, the large and small segments 19, 23 are unlocked from the expanded position. At the same time, the air brake 75 is actuated to engage the quill 73 and prevent its rotation with drive shaft 53. With the quill 73 held from rotation, the quill adapter 43 which is keyed to quill 73 is therefore also prevented from rotating. In turn, the large and small segments 19 and 23 connected to the quill adapter 43 through hub 45 and guide shafts 47 are also prevented from rotating and remain stationary with respect to the drive shaft 53 and scroll sleeve 55.

Although the quill adapter 43 and therefore the lock collar assembly 77 are held from rotating, the scroll sleeve 55 is nevertheless rotatable with drive shaft 53 is a clockwise or first direction because it is connected thereto by key 57. Since only the drive shaft 53 and scroll sleeve 55 rotate with the air brake 75 engaging quill 73, the drive pins 63, 65 follow or move along grooves 59, 61 in scroll sleeve 55 with the rotation thereof. Due to the spiral configuration of grooves 59 and 61, clockwise rotation of scroll sleeve 55 urges cones 41 and 42 axially apart from a position adjacent hub 45 to an outward position near the ends of scroll sleeve 55. The axial movement of cones 41, 42 apart from one another causes the large and small segments 19 and 23 to be drawn inwardly from their extended position to a collapsed or contracted position as the angulated pins 39 and 40 slide along their respective bearing sleeves 37.

As shown in the contracted position of radial mandrel 11 in FIG. 2, the small segments 23 and small shells 15 move radially inwardly toward the drive shaft 53 a greater distance than the large segments 19 and large shells 13. This is due to the fact that the angulated pins 39 which support the large segments 19 are disposed at a lesser angle relative to the longitudinal axis of the drive shaft 53 than the angulated pins 40 which support the small segments 23. For example, in the particular embodiment of the radial mandrel 11 shown in the drawings, the angulated pins 39 supporting large segments 19 are disposed at approximately a 24° angle with respect to the horizontal or longitudinal axis of drive shaft 53 while the angulated pins 40 supporting small segments 23 are disposed at an angle of approximately 30°. The steeper angle of the angulated pins 40 enables the small segments 23 to travel a further distance at a faster rate than the large segments 19 as the cones 41, 42 move apart from one another during the contracting operation. Therefore, when the drive pins 63, 65 following along grooves 59, 61 to dispose cones 41, 42 at their furthest distance apart, the large and small segments 19, 23 are contracted to an extent whereby the carcass which was made on the radial mandrel 11 may be removed over the lock collar assembly 77 of the mandrel 11.

To now move the radial mandrel 11 to an expanded position, the air brake 75 remains in contact with quill 73, but the direction of rotation of drive shaft 53, and in turn scroll sleeve 55, is reversed to a second or counterclockwise direction. The drive pins 63, 65 thus follow or move along grooves 59, 61 in the opposite direction with the counterclockwise rotation of scroll sleeve 55, urging cones 41, 42 toward one another to a point adjacent hub 45 as shown in FIG. 3. In turn, cones 41 and 42 force the segments 19, 23 and shells 13, 15 radially outwardly relative to the scroll sleeve 55 as the angulated pins 39 and 40 slide along their respective bearing sleeves 37.

As discussed above, only the drive shaft 53 and scroll sleeve 55 keyed thereto rotate when the air brake 75 is in contact with quill 73. None of the other elements of radial mandrel 11 are rotatable at this time, enabling the axial movement of cones 41, 42 relative to the scroll sleeve 55 to take place. Once the large and small segments 19, 23, and in turn the large and small shells 13, 15, are urged radially outwardly to their expanded position by cones 41, 42, the lock collar assembly 77 is placed into engagement with the quill adapter 43 and air brake 75 is disengaged from quill 73. The quill 73 is then free to rotate with drive shaft 53 which in turn causes the rotation of quill adapter 43, lock collar assembly 77 and scroll sleeve 55 as discussed above.

Unlike existing radial mandrels, the scroll sleeve mechanism for expanding and contracting the radial mandrel of this invention is adapted for use with a standard drive shaft which need not be formed with threaded portions or similar structure as found on prior art drive shafts for radial mandrels. This not only lessens the expense but makes the scroll sleeve mechanism of this invention much more easily adapted for use with radial mandrels of various design since it may be used with drive shafts of standard configuration.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Having described our invention, we claim:

1. In a radial mandrel for use in forming wound objects, said radial mandrel having a drive shaft and a plurality of alternating large segment means and small segment means supported by a pair of cone means, said pair of cone means being adapted to move axially toward and away from one another to move said large and small segment means radially inwardly and outwardly between a contracted and expanded position, the improvement comprising:

a mechanism for axially moving said pair of cone means toward and away from one another, said mechanism including a sleeve rotatable with said drive shaft in a first and second direction, said sleeve being formed with a pair of groove means in the exterior surface thereof, said pair of cone means engaging respective ones of said groove means and following therealong with the rotation of said sleeve, said pair of cone means being moved axially apart while following said groove means with said sleeve and drive shaft rotating in said first direction for radially moving said large and small segment means to a retracted position, and said pair of cone means being moved axially toward one another while following said groove means with said sleeve and drive shaft rotating in said second direction for radially moving said large and small segment means to an expanded position.

2. The radial mandrel of claim 1 wherein said sleeve is a scroll sleeve formed with right and left-hand spiral grooves in the exterior surface thereof.

3. The radial mandrel of claim 2 wherein said pair of cone means each include a drive pin, one of said drive pins engaging respective ones of said spiral grooves and following therealong as said scroll sleeve rotates, said drive pins moving said pair of cone means apart while following said grooves with said scroll sleeve rotating in a clockwise direction and said drive pins moving said pair of cone means together while following said grooves with said sleeve rotating in a counterclockwise direction.

4. The radial mandrel of claim 1 further including a quill rotatable with said drive shaft and a brake means operable to prevent rotation of said quill with said shaft, and wherein said mechanism includes a quill adapter rotatable with said quill, said quill and quill adapter being held from rotating by said brake means while said sleeve and drive shaft rotate in said first and second directions for moving said pair of cone means axially apart and together, said pair of cone means engaging and axially moving along said quill adapter.

5. A radial mandrel for use in forming cylindrical wound objects, comprising:
   a rotatable drive shaft;
   a quill rotatable with said drive shaft;
   brake means operable to engage said quill to prevent rotation thereof with said drive shaft, and operable to disengage said quill to permit rotation thereof with said drive shaft;
   a plurality of alternating and interfitting large segments and small segments supporting large and small shells respectively,
   a pair of cones adapted to be connected to said large and small segments, said cones being movable axially toward and away from one another for moving said large and small segments and in turn said large and small shells radially inwardly and outwardly between a contracted position and an expanded position, each of said cones having a drive pin extending therefrom toward said drive shaft; and
   a mechanism for moving said pair of cones axially toward and away from one another, said mechanism including a quill adapter concentrically disposed about said drive shaft and rotatable with said quill, said pair of cones being mounted to said quill adapter and axially movable therealong, and a scroll sleeve concentrically disposed over said drive shaft and within said quill adapter, said scroll sleeve alone being rotatable with said drive shaft in a first and second direction upon engagement of said brake means with said quill to prevent rotation of said quill and quill adapter with said drive shaft, said scroll sleeve having an exterior surface formed with a pair of groove means, one of said drive pins engaging a respective one of said groove means and following therealong with the rotation of said scroll sleeve and shaft means, said pair of cones being moved axially apart while said drive pins follow said groove means as said scroll sleeve and drive shaft rotate in the first direction for radially moving said large and small segments and shells to a retracted position, said pair of cones being moved axially toward one another while said drive pins follow said groove means as said scroll sleeve and drive shaft rotate in the second direction for radially moving said large and small segments and shells to an expanded position.

6. A radial mandrel for use in forming wound objects comprising:
   a rotatable drive shaft;
   a quill concentrically disposed about at least a portion of said drive shaft and rotatable therewith;
   brake means operable to engage said quill to prevent rotation thereof with said drive shaft, and operable to disengage said quill to permit rotation thereof with said drive shaft;
   quill adapter means keyed to said quill for rotation therewith, said quill adapter means being concentrically disposed about said quill;
   a plurality of alternating and interfitting large segments and small segments supporting large and small shells respectively,
   a pair of cones adapted to be connected to said large and small segments, said cones being movable axially toward and away from one another along said quill adapter for moving said large and small segments and in turn said large and small shells radially inwardly and outwardly between a contracted position and an expanded position, each of said cones having a drive pin extending therefrom toward said drive shaft; and
   a scroll sleeve concentrically disposed over said drive shaft and within said quill adapter, said scroll sleeve being rotatable with said drive shaft in a first and second direction, said scroll sleeve being formed with a pair of spiral grooves in the exterior surface thereof, one of said drive pins a respective one of said spiral grooves and following therealong with the rotation of said scroll sleeve, said pair of cones being moved axially apart while said drive pins follow said spiral grooves as said scroll sleeve and drive shaft rotate in the clockwise direction for radially moving said large and small segments and shells to a retracted position, said pair of cones being moved axially toward one another while said drive pins follow said spiral grooves as said scroll sleeve and drive shaft rotate in the counterclockwise direction for radially moving said large and small segments and shells to an expanded position.

7. In a radial mandrel for use in forming cylindrical wound objects comprising:
   radially contractable segments forming a cylindrical surface,
   a pair of axially movable cones supporting said segments, said segments being contractable and expandable upon axial movement of said cones,
   mechanism for selectively rotating said cones and moving said cones axially comprising:
   a drive shaft,
   a sleeve having right and left-hand spiral grooves in opposite end portions thereof, said sleeve being attached to said shaft for rotation therewith,
   pins projecting from said cones into said spiral grooves to cause said cones to move axially when said sleeve is rotated with respect to said cones,
   a quill surrounding said sleeve, said quill being connected to said cones to rotate them as said quill rotates,
   means for selectively connecting and disconnecting said quill to said sleeve to drive said quill and cones together when connected and to axially move said cones with respect to said quill when disconnected.

8. A mandrel as in claim 7 further comprising:
   means to brake rotation of said quill when said quill is disconnected from said sleeve to hold said quill and cones against rotation as said sleeve is rotated by said drive shaft.

\* \* \* \* \*